US008838837B2

(12) United States Patent
Bonaci et al.

(10) Patent No.: US 8,838,837 B2
(45) Date of Patent: Sep. 16, 2014

(54) FAILOVER MECHANISM

(75) Inventors: Davor Bonaci, Redmond, WA (US); Sambhrama Mundkur, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 13/167,518

(22) Filed: Jun. 23, 2011

(65) Prior Publication Data

US 2012/0331180 A1  Dec. 27, 2012

(51) Int. Cl.
G06F 15/16 (2006.01)
G06F 11/14 (2006.01)
G06F 9/06 (2006.01)
G06F 11/20 (2006.01)

(52) U.S. Cl.
CPC .............. *G06F 9/06* (2013.01); *G06F 11/2012* (2013.01); *G06F 11/1484* (2013.01); *G06F 11/2005* (2013.01); *G06F 11/2007* (2013.01)
USPC ........................................................ 709/250

(58) Field of Classification Search
USPC ........................................................ 709/250
See application file for complete search history.

(56) References Cited

U.S. PATENT DOCUMENTS

| | | | |
|---|---|---|---|
| 7,606,141 B2 | 10/2009 | Schimke et al. | |
| 7,689,987 B2 * | 3/2010 | Neil ................................. | 718/1 |
| 7,761,578 B2 * | 7/2010 | Henry et al. .................. | 709/227 |
| 8,225,332 B2 * | 7/2012 | Aloni et al. .................... | 719/319 |
| 8,549,313 B2 * | 10/2013 | Seguin et al. .................. | 713/182 |
| 2006/0251120 A1 | 11/2006 | Arimilli et al. | |
| 2007/0162572 A1 | 7/2007 | Aloni et al. | |
| 2007/0174850 A1 | 7/2007 | El Zur | |
| 2007/0244972 A1 * | 10/2007 | Fan ................................ | 709/205 |
| 2010/0095310 A1 | 4/2010 | Oshins | |
| 2010/0115329 A1 | 5/2010 | Tanaka et al. | |
| 2011/0090910 A1 * | 4/2011 | Tripathi et al. ............. | 370/395.1 |
| 2012/0281711 A1 * | 11/2012 | Karaoguz et al. ............. | 370/419 |
| 2013/0124702 A1 * | 5/2013 | Shah et al. .................... | 709/221 |

OTHER PUBLICATIONS

Shivam et al. EMP:Zero-copy OS-bypass NIC-driven Gigabit Ethernet Message Passing, pp. 1-8, 2001.*
Broadcom Ethernet Network Controller Enhanced Virtualization Functionality, Jul. 2010, 11 pgs. http://www.dell.com/downloads/global/products/pedge/en/BroadcomDel-lEnhancedVirualizationFunctionalityWhitePaper.pdf.

* cited by examiner

*Primary Examiner* — Larry Donaghue
(74) *Attorney, Agent, or Firm* — John Jardine; Andrew Sanders; Micky Minhas

(57) ABSTRACT

Some embodiments of the invention provide a failover capability in a computer system that employs multiple paths to transfer information between virtual machines and a network, without introducing a driver component to provide this capability. For example, some embodiments of the invention provide a networking virtual switch client capable of direct communication between a networking stack implemented by a virtual machine operating system and components comprising either a direct path or a synthetic path to a network interface controller coupled to a network. The networking virtual switch client may be capable of determining which of the paths to employ for a given communication, such as by determining that a synthetic path should be employed if a direct path is not available.

19 Claims, 4 Drawing Sheets

FAILOVER MECHANISM

BACKGROUND

An operating system comprises software, including programs and data, that runs on a computer to manage the computer's resources, and to provide services used during execution of application programs on the computer. Many conventional operating systems also provide a computer with the capability to communicate with one or more other devices via a network. For example, many conventional operating systems support one or more networking protocols (e.g., the Transport Control Protocol/Internet Protocol, or TCP/IP, protocol) through implementation of a "network stack." Many operating systems also implement interfaces defining how various protocols make use of transport hardware (e.g., a network interface controller, or NIC). For example, certain of the WINDOWS® family of operating systems offered by Microsoft Corporation of Redmond, Wash. implement the Network Driver Interface Specification, or NDIS, to manage how transport protocol software employs NIC hardware.

This interface is illustrated conceptually in FIG. 1. In system 100 shown in FIG. 1, NIC 105 comprises a hardware component that connects a computer to network 130. Driver 110 enables operating system 115, which implements networking stack 125 and interface 120, to employ the functionality provided by NIC 105. As operating system 115 and driver 110 are commonly provided by separate entities (e.g., driver 110 may be made available by the same entity that makes available NIC 105), interface 120 enables networking stack 125 to employ driver 110 to manage the functions provided by NIC 105.

Virtualization is a technique through which one or more physical components of a computer is abstracted into virtual components. For example, virtualization may involve the creation of one or more "virtual machines" on a physical "host" computer. Each virtual machine may perform like a physical computer, such as by executing an operating system. For example, a host computer that executes a first operating system may have running thereon a first virtual machine that executes a second operating system and a second virtual machine that executes a third operating system. One feature of virtualization that makes it attractive for users is that each virtual machine on a computer is isolated from the computer's physical components and other virtual machines. For example, software executed by a virtual machine is separated from the underlying hardware components of the physical computer that perform the execution. The ability to isolate one virtual machine from all other virtual machines on the computer can be useful with computers that employ networking. For example, if a computer is used as a web server, an administrator may find it useful to establish a virtual machine dedicated to responding to web requests originating from a particular group of users.

SUMMARY

The inventors have recognized that virtualization can complicate networking. For example, some host computers that receive information over a network may employ multiple paths to transfer the information to virtual machines on the computer, and to transfer the information from a virtual machine to the network. In configurations that provide multiple paths within the host computer for transferring information to and from virtual machines, a failover capability is useful (e.g., in case one of the multiple paths becomes unavailable, or it is less desirable to use one path than another). Failover capability may, for example, be provided by an intermediate driver component introduced into the configuration. The inventors have recognized, however, that a solution which does not introduce an intermediate driver component may provide even greater overall system throughput, and decrease configuration and maintenance overhead. As a result, some embodiments of the invention provide a failover capability in a computer system that employs multiple paths to transfer information to and from virtual machines, without introducing an intermediate driver component to do so.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As noted above, the inventors have recognized that virtualization can complicate networking. For example, some host computers that receive information over a network may employ multiple paths to pass the information from a physical network interface to virtual machines on the computer, and to pass information from a virtual machine for delivery over the network. Providing a failover capability, so that if any of the paths becomes unavailable another path can be used to pass information, can complicate the processing of information received via a network.

Figure 1:
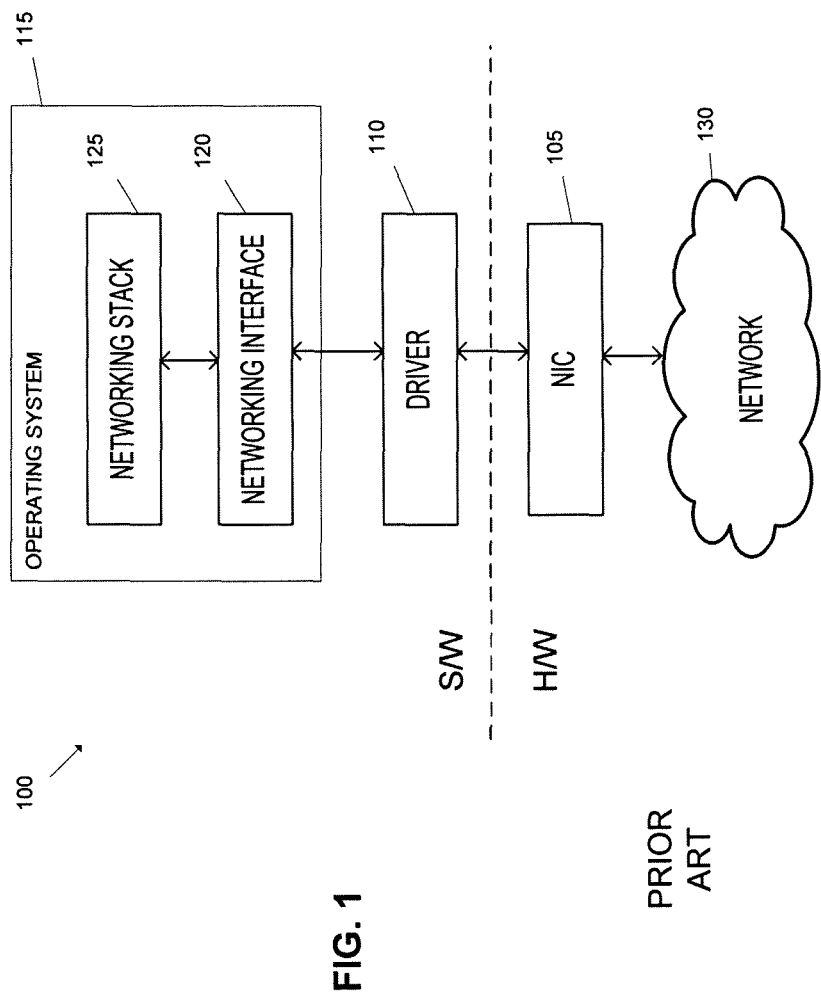
FIG. 1 is a block diagram depicting example computer components and an example method for processing information received from or being delivered to a network, in accordance with the prior art.
Figure 2:
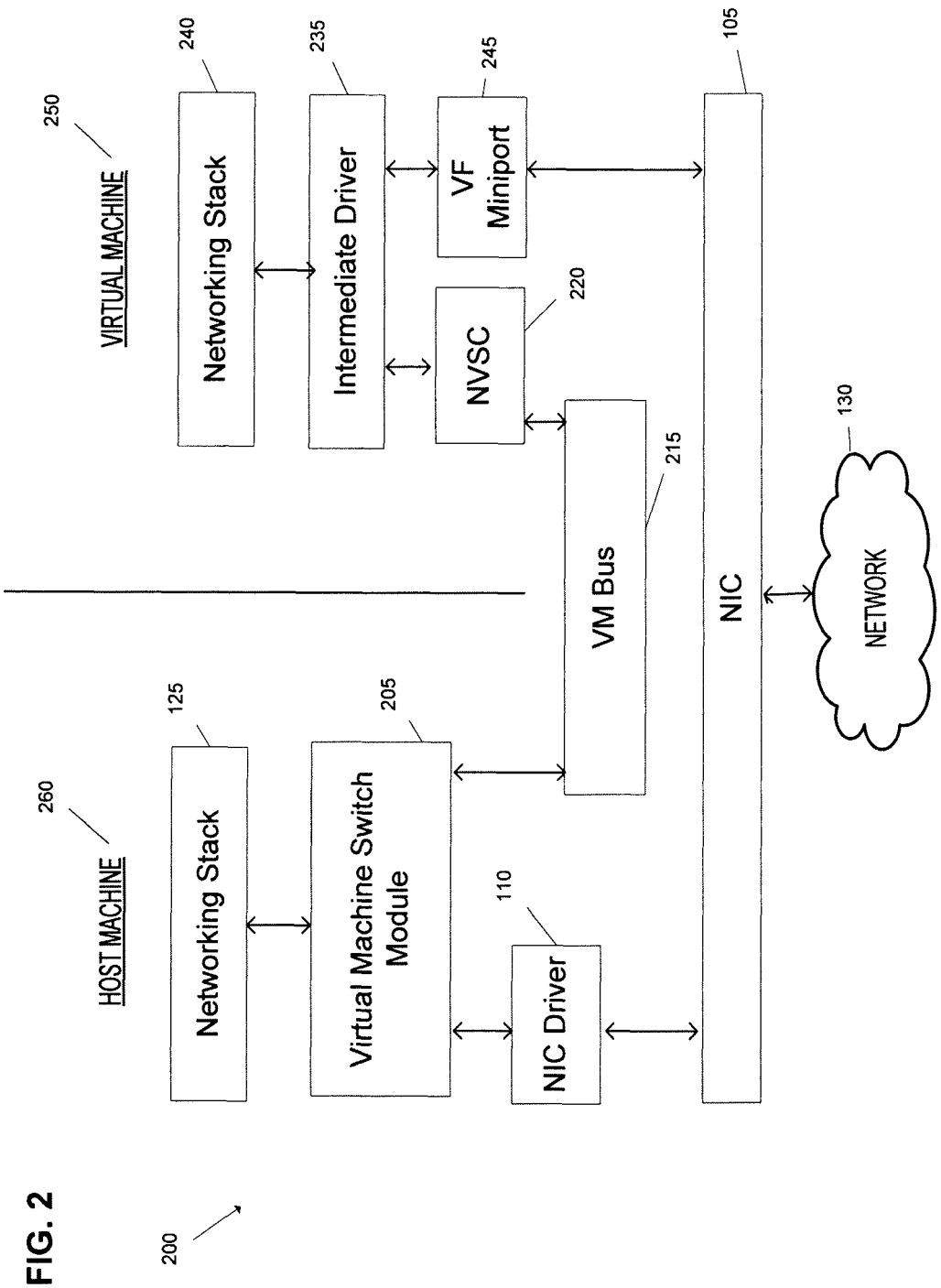
FIG. 2 is a block diagram depicting example components and an example method for processing information received from or being delivered to a network, in configurations supporting virtualization.

FIG. 2 illustrates why providing a failover capability can complicate networking on a computer employing virtualization. FIG. 2 depicts example components in a computer 200 that employs virtualization. In the example shown, computer 200 includes host machine 260 and virtual machine 250. Although only one virtual machine is depicted in FIG. 2, it should be appreciated that any number of virtual machines may be implemented by a computer employing virtualization. For example, it is not uncommon for dozens or even hundreds of virtual machines to be implemented on a given conventional computer.

In the example configuration shown in FIG. 2, there are two paths through which information may be passed to or from virtual machine 250, including a "synthetic" path and a "direct" path. Information arriving from network 130 and traveling over the synthetic path is received by NIC 105 and passed to driver 110. Driver 110 then passes the information to virtual machine (VM) switch module 205. VM switch module 205 may, for example, receive incoming information and determine which virtual machine on the computer should receive it. In some implementations, VM switch module 205 is a component of the host machine operating system, although it may be implemented in any of numerous ways.

VM switch module 205 passes the information via virtual miniport 210 (which may, for example, comprise a driver) to networking stack 125 implemented by the host machine's operating system. Networking stack 125 then passes the information back to VM switch module 205, which directs the information to the appropriate virtual machine. In this example, VM switch module 205 determines that the information should be passed to virtual machine 250.

To deliver the information to virtual machine 250, VM switch module 205 employs virtual machine (VM) bus 215. In some implementations, VM bus 215 may comprise one or more software components. A VM bus may be used by a VM switch module to deliver information to any suitable number of virtual machines. For example, a single VM bus may be used on a computer that implements numerous virtual machines, or multiple VM buses may be employed to transfer information to virtual machines.

Virtual machine 250 receives the information passed via VM bus 215 at networking virtual switch client (NVSC) 220. NVSC 220 may, for example, perform functions which are somewhat analogous to those performed driver 110 within host machine 260, in that NVSC 220 may enable the delivery of the information to networking stack 240 implemented by the operating system of virtual machine 250.

The example configuration shown in FIG. 2 also provides a second, "direct" path over which information may be delivered to virtual machine 250. In this respect, it should be appreciated that in some implementations, a NIC may provide switching capabilities that are somewhat analogous to those which are provided by VM switch module 205 described above. For example, NIC 105 may be capable of determining which virtual machine on the computer should receive information received via network 130, thereby relieving the host computer's operating system from having to perform the processing to make this determination, and delivering the information to that virtual machine. In the example shown, information received over this direct path is passed to networking stack 240 of virtual machine 250 via virtual function (VF) miniport 245, which in some embodiments comprises a driver component configured to deliver information to and receive information from networking stack 240 implemented by virtual machine 250.

Delivery of information via the direct path may be preferable to delivery via the synthetic path for several reasons. For example, the direct path may be faster than the synthetic path. In addition, using the direct path may avoid tying up processing resources on host machine 260 to perform switching-related processing that might otherwise be performed by NIC 105. In this respect, it should be appreciated that the processing otherwise performed by VM switch module 205 to determine the virtual machine to which information should be delivered and implement networking protocols is a relatively time-consuming and processor-intensive exercise. As a result, the direct path generally provides much higher throughput, and is therefore preferred, to the synthetic path, if available for use.

In configurations that provide multiple paths for passing information to and from virtual machines, a failover capability is useful, in case it becomes desirable to employ one path instead of another for any reason. For example, one of the paths may become unavailable. A path may become unavailable for any of numerous reasons. For example, a conventional NIC that provides switching capabilities may have limited capacity to pass information to virtual machines, and the number of virtual machines implemented on a computer may exceed this capacity, so that the VM bus 215 may have to be used to deliver information to or from a virtual machine.

One approach to providing a failover capability is shown in FIG. 2. In FIG. 2, an intermediate driver 235 sits between NVSC 220 and networking stack 240, enabling networking stack 240 to pass information to NIC 105 whether or not the direct path via VF miniport 245 is available. That is, intermediate driver 235 allows the information to be passed to NVSC 220, and then along the synthetic path comprised of VM bus 215, VM switch module 205 and driver 110 to NIC 105, if it becomes desirable to do so (e.g., if VF miniport 245 becomes unavailable).

The inventors have recognized that an alternative approach to that which is depicted in FIG. 2 may yield even greater results. In this respect, the inventors have recognized that an approach in which no intermediate driver is introduced between NVSC 220 and networking stack 240, and between VF miniport 245 and networking stack 240, may provide greater throughput than one in which an intermediate driver is introduced. For example, adding a separate component to process information being delivered to networking stack 240 may increase the total amount of processing performed, and decrease the speed at which information reaches its destination.

Another reason why not introducing an intermediate driver may increase overall throughput is that if an intermediate driver is introduced, all information traveling to or from the networking stack is processed by the intermediate driver, whether or not the direct path is available. This may detract from the benefit to employing the direct path in the first place. Thus, introducing an intermediate driver may reduce overall throughput even if the direct path is available for use.

In addition, not introducing an intermediate driver can decrease configuration and maintenance overhead. In this respect, it should be appreciated that each networking component shown in FIG. 2 may require significant configuration. For example, NVSC 220 and VF miniport 245 each have a MAC address, an IP address and numerous advanced networking features that have to be configured for information to be transferred seamlessly. Introducing an intermediate driver to the configuration adds a component to be configured, and adds a layer of complexity in enabling NVSC 220, VF miniport adapter 245 and the intermediate driver to interoperate. For example, it may be unclear to an administrator whether certain configuration details apply to all of NVSC 220, VF miniport 245, and intermediate driver 235, or some subset. As such, not introducing an intermediate driver can decrease the time and effort needed to configure and maintain a computer system.

As such, in accordance with some embodiments of the invention, an alternative failover mechanism is provided. An example implementation 300 of this alternative is shown in FIG. 3.

Figure 3:
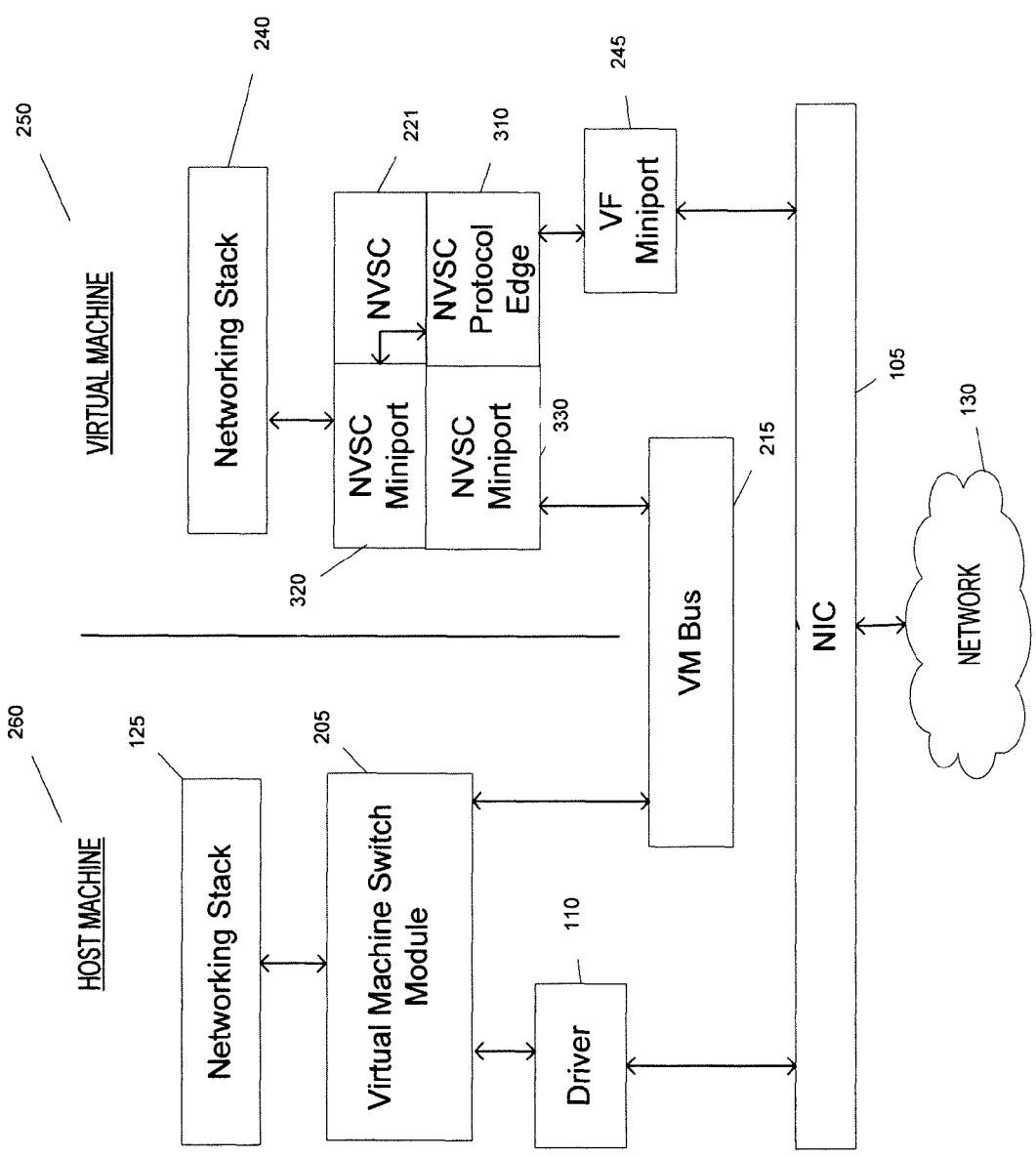
FIG. 3 is a block diagram depicting example components and an example method for processing information received from or being delivered to a network, in accordance with some embodiments of the invention.

In the example shown in FIG. 3, rather than introducing an intermediate driver between NVSC 220 and networking stack 240, and between VF miniport 245 and networking stack 240, NVSC 221 communicates directly with each of VM bus 215, networking stack 240 and VF miniport 245. By providing the capability to transfer information from networking stack 240 along either the direct path or the synthetic path, NVSC 221 may fail over to either path if using the other becomes less desirable, for any of numerous reasons. For example, if the direct path between NIC 105 and networking stack 240 becomes unavailable, NVSC 221 may provide a capability to fail over to the synthetic path, without incurring the processing and/or maintenance overhead associated with introducing an intermediate driver.

In the example implementation shown, NVSC 221 includes NVSC protocol 310, NVSC miniport 320 and NVSC microport 330. In some embodiments, each of NVSC protocol 310, NVSC miniport 320 and NVSC microport 330 comprise programmed instructions for delivering information via either the direct or synthetic path. In some embodiments in which NDIS is employed, NVSC 221 may register as an NDIS protocol driver, thereby exposing NVSC miniport 320 to networking stack 240.

In the example shown, to accomplish information transfer via the direct path, a binding is provided between NVSC protocol 310 and VF miniport 245. As those skilled in the art will recognize, a binding is akin to a "pipe" enabling direct transfer of information between two components, according to predefined specifications (e.g., a contract defined by NDIS may govern communication via the binding between NVSC protocol 310 and VF miniport 245). Thus, in the example implementation shown in FIG. 3, information flows along the direct path along the binding between VF miniport 245 and NVSC protocol 310. Similarly, a binding is provided between NVSC protocol 310 and NVSC miniport 320, and between NVSC miniport 320 and networking stack 240, enabling information to flow between NIC 105 and networking stack 240 along the direct path.

In some embodiments, the binding between VF miniport 245 and NVSC 221 is maintained by marking NVSC 221 as "hidden" so that a user can not alter or remove the binding, thus preserving the direct path for use when available. Of course, embodiments of the invention are not limited to preserving a binding between VF miniport 245 and NVSC 221 in this manner, as any of numerous techniques may alternatively be used.

In some embodiments, NVSC miniport 320 comprises a set of handlers providing functionality that is somewhat analogous to that which is provided by driver 110, described above, in that NVSC miniport 320 enables networking stack 240 to employ the capability to communicate information that is provided by VF miniport 245. In some embodiments, NVSC protocol 310 comprises programmed instructions that provide functionality analogous to that which is provided by the networking stack in the virtual machine, in that NVSC protocol 310 implements the protocol used to communicate via VF miniport 245 and the direct path.

In the example implementation shown, to accomplish information transfer along the synthetic path, information flowing from networking stack 240 is received at NVSC miniport 320 and passed to NVSC microport 330. NVSC microport 330 comprises a set of handlers providing functionality analogous to that which is provided by PF miniport adapter 110, described above, in that NVSC microport 330 enables networking stack 240 to employ capability to communicate information that is provided by VM bus 215. In this respect, in the example implementation shown in FIG. 3, a binding is provided between NVSC microport 330 and VM bus 215, so that information may flow between the two components via a direct connection.

In some embodiments, specifications for the transfer of information between NVSC microport 330 and VM bus 215 is defined not by NDIS, but rather by a contract defined between NVSC microport 330 and VM bus 215. Of course, embodiments of the invention are not limited to such an implementation, as numerous alternatives are possible. For example, in some implementations, an NDIS-defined contract may govern communication via a binding between NVSC microport 330 and VM bus 215.

In the example implementation shown in FIG. 3, NVSC 221 provides a failover mechanism so that if a direct path between networking stack 240 and NIC 105 is not available, a synthetic path may be employed. This may be accomplished in any of numerous ways. In some embodiments, NVSC 221 implements programmed logic (e.g., within NVSC miniport 320) defining one or more criteria that are used to enable NVSC 221 to determine whether information flows via a direct path to NIC 105 via VF miniport 245, or via a synthetic path through NVSC microport 330 to VM bus 215. Any one or more criteria may be defined, as embodiments of the invention are not limited in this respect.

For example, in some embodiments, one or more "trigger points" defining whether one path or another is used may be defined. As an example, the availability of a particular path, or the desirability of using one path as opposed to the other, may comprise a trigger point used to determine which path is employed. Thus, NVSC protocol driver 310 may process information received from networking stack 240 to determine the application of any one or more trigger points governing whether the direct path or synthetic path should be used to transfer the information to NIC 105. Any of numerous trigger points and/or other criteria may be defined and/or employed, as embodiments of the invention are not limited to any particular implementation.

It should be appreciated that a determination whether to employ a direct or synthetic path need not be performed by a component of NVSC 221. For example, in some embodiments, one or more components of management operating system 115 may prescribe that either a direct or synthetic path be used under certain conditions. For example, NIC 105 were taken offline (e.g., for maintenance), then management operating system 115 may specify that any connections maintained over a direct path to networking stack 240 be migrated to a synthetic path. A determination whether to employ a direct or synthetic path may be made based on any suitable criteria, by any suitable component(s), as embodiments of the invention are not limited in this respect.

Some embodiments of the invention may enable connectivity to be maintained throughout transitions between the direct and synthetic paths. In this respect, in some embodiments of the invention, NVSC 221 may introduce a layer of abstraction between networking stack 240 and the individual miniports used to accomplish information transfer via either the direct or synthetic path. As a result, the use of a particular miniport to transfer information may be made transparent to the networking stack. In such embodiments, if a failover from one path to another is performed, the networking stack is unaware of it, and any connection used by the networking stack to transfer information may be maintained after failover is complete. By contrast, in arrangements in which the networking stack is aware of the use of individual miniports to transfer information, if a particular miniport that is being used to transfer information over a connection becomes unavailable so that another miniport is to be used, the connection is reset, and any part of the information that had been transferred prior to the connection being reset must be transmitted again. For example, if a connection was maintained to download a file, and a miniport supporting the connections became unavailable, then the connection would be reset using another miniport, and the download would need to be restarted from the beginning. By contrast, some embodiments of the invention, by introducing a layer of abstraction between the networking stack and the miniports, makes the use or availability of particular miniports transparent to the networking stack, so that connections may be maintained even if a transfer from one miniport to another is performed.

It should be appreciated that although the example of FIG. 3 depicts NVSC 221 being implemented within the operating system of VM 250, embodiments of the invention are not limited to such an implementation. For example, if the functionality described herein is provided by programmed instructions, such instructions may reside in any suitable body or bodies of code, executable by a host machine, virtual machine, or other component(s). Embodiments of the invention are not limited in this respect.

It should also be appreciated that the functionality described herein need not be provided solely via software. Embodiments of the invention may be implemented, for example, via combinations of hardware and software. Further, whether implemented via software or a combination of hardware and software, embodiments of the invention need not comprise components arranged as shown in FIG. 3, as any suitable arrangement(s) and/or architecture(s) may be employed. Embodiments of the invention are not limited in this respect.

It should also be appreciated that use of such terms herein as "miniport," "driver" and "NDIS" is not intended to limit the application of embodiments of the invention to the specific platforms with which these terms are conventionally used. For example, some platforms employ the term "netdevice" or "net_device" as an equivalent to the term "miniport." Embodiments of the invention may be employed with any platform(s) in which an operating system employs networking hardware and/or software to communicate via a network with another device, whether or not such platform(s) implement(s) components known as miniports and/or drivers, or employ(s) NDIS.

Figure 4:
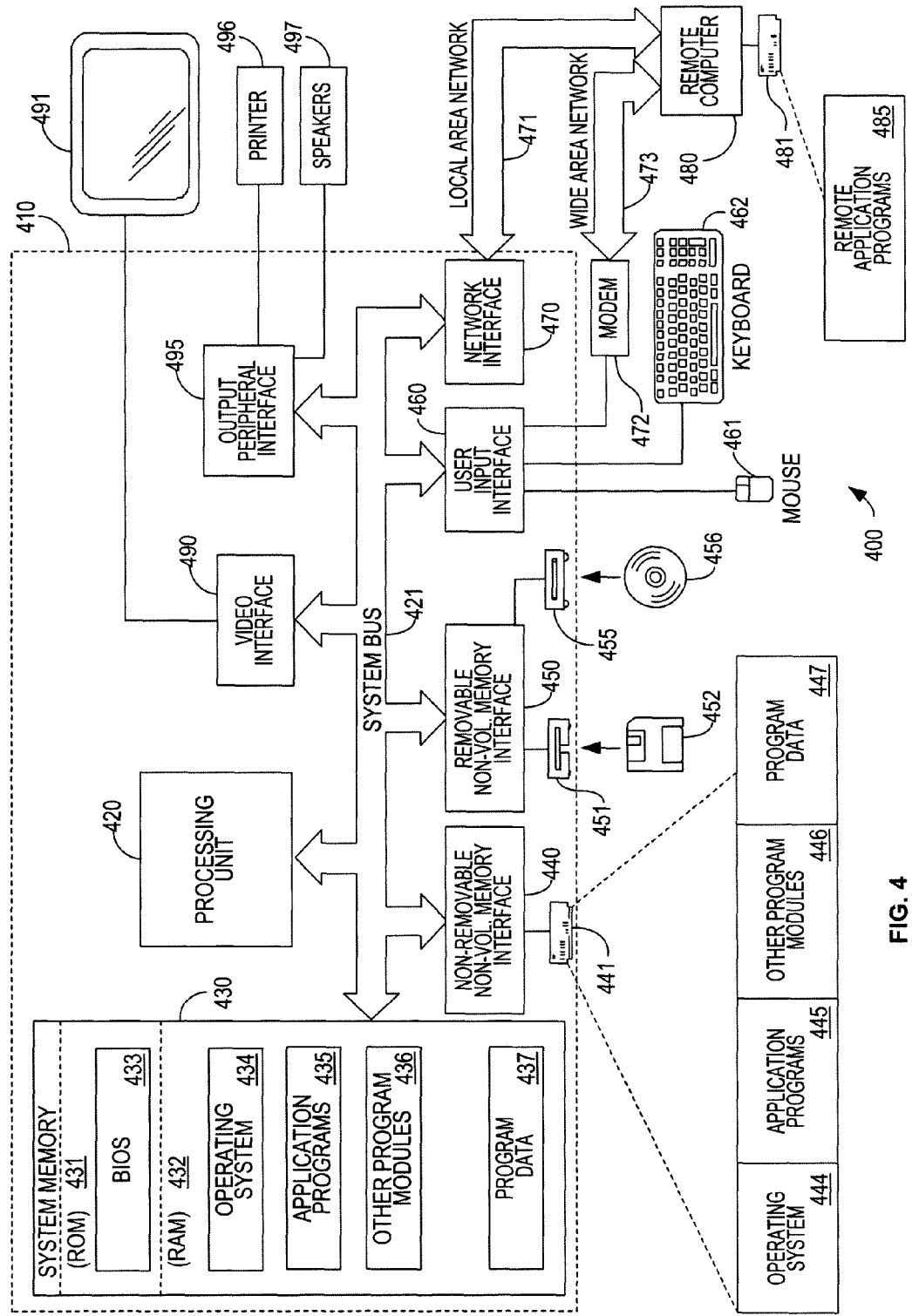
FIG. 4 is a block diagram depicting an example computer, which may be used to implement aspects of embodiments of the invention.

FIG. 4 illustrates an example of a suitable computing system environment 400 on which the invention may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 440 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through an non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through a output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium and/or storage device) encoded with one or more programs that, when executed on one or more computers or other processors, perform methods that implement the various embodiments of the invention discussed above. As is apparent from the foregoing examples, a computer readable storage medium may retain information for a sufficient time so as to be considered a non-transitory storage medium. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing, and is therefore not limited in its application to the details and arrangement of components set forth in the foregoing description or illustrated in the drawings. For example, aspects of one embodiment may be combined in any manner with aspects of other embodiments.

Also, the invention may be embodied as a method, an example of which is described with reference to the drawings. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer system, comprising:
   a network interface controller, operable to couple the computer system to at least one network; and
   at least one processor, programmed to implement:
      a host machine, executing a host operating system;
      a virtual machine executing a virtual machine operating system implementing a networking stack;
      a bus to transfer information between the virtual machine operating system and the host machine operating system;
      a virtual function miniport to transfer information between the networking stack of the virtual machine operating system and the network interface controller; and
      a networking virtual switch client, in direct communication with both the bus and the virtual function miniport, enabling transfer of information from the networking stack of the virtual machine operating system to the network interface controller over either a direct path via the virtual function miniport or a synthetic path via the bus, wherein the networking virtual switch client is operable to determine whether to transfer information from the networking stack of the virtual machine operating system over the direct path or the synthetic path.

2. The computer system of claim 1, wherein the at least one processor is programmed to implement one or more criteria evaluated by the networking virtual switch client in determining whether to transfer the information over the direct path or the synthetic path.

3. The computer system of claim 1, wherein a first binding enables direct communication between the networking virtual switch client and the bus, and a second binding enables direct communication between the networking virtual switch client and the virtual function miniport.

4. The computer system of claim 1, wherein the at least one processor is programmed to implement a plurality of virtual machines, and wherein the network interface controller is operable to determine, in response to receiving a communication via the at least one network, which of the plurality of virtual machines is to receive the communication.

5. The computer system of claim 1, wherein the networking virtual switch client comprises a component of the virtual machine operating system.

6. The computer system of claim 5, wherein the networking virtual switch client comprises a driver component of the virtual machine operating system.

7. The computer system of claim 1, wherein the networking stack is operable to format information to be communicated in accordance with at least one networking protocol.

8. A method for use in a computer system coupled to at least one network, the computer system executing at least one operating system, the computer system providing a first path and a second path for communicating information via the at least one network, the method comprising:
   (A) in response to receiving, from the at least one operating system, information to be communicated via the at least one network, determining whether the information is transferred to the at least one network via the first path or the second path.

9. The method of claim 8, wherein the computer system comprises a host machine and at least one virtual machine, the at least one operating system comprises a host operating system executed by the host machine and at least one virtual machine operating system executed by each at least one virtual machine, the first path is a synthetic path over which information sent by the virtual machine operating system to the at least one network travels via the host operating system, the second path is a direct path over which information sent by the virtual machine operating system to the at least one network does not travel via the host operating system, and wherein (A) comprises determining, in response to receiving information from the at least one virtual machine operating system, whether the information is to be transferred to the at least one network via the synthetic path or the direct path.

10. The method of claim 9, wherein the determining is based at least in part on whether the direct path is available to transfer the information by a network interface controller that couples the computer system to the at least one network.

11. The method of claim 9, wherein the determining is based at least in part on one or more criteria defined by a component of the virtual machine operating system.

12. The method of claim 9, wherein the determining is based at least in part on one or more criteria defined by a component of the host machine operating system.

13. The method of claim 9, wherein the determining is based at least in part on a characteristic of the information to be communicated via the at least one network.

14. The method of claim 13, wherein the computer system comprises a bus to transfer information over the synthetic path between the virtual machine operating system and the host machine operating system, a network interface controller to communicate information via the at least one network, and a virtual function miniport to transfer information over the direct path between the virtual machine operating system and the network interface controller, and wherein the determining is performed by a component of the virtual machine operating system which communicates directly with both the bus and the virtual function miniport.

15. The method of claim 14, wherein the component of the virtual machine operating system is a driver component implemented by the virtual machine operating system.

16. At least one storage device having instructions recorded thereon which, when executed in a computer system, coupled to at least one network, comprising a host machine executing a host operating system and a virtual machine executing a virtual machine operating system, perform a method comprising:
  (A) receiving, from the virtual machine operating system, information to be communicated via the at least one network;
  (B) determining that one of a synthetic path over which the information travels to the at least one network via the host operating system and a direct path over which the information does not travel to the at least one network via the host operating system is unavailable; and
  (C) causing the information is to be transferred to the at least one network via the other of the synthetic path and the direct path.

17. The at least one storage device of claim 16, wherein the computer system comprises a network interface controller to communicate information via the at least one network, a bus to transfer information over the synthetic path between the virtual machine operating system and the host machine operating system, and a virtual function miniport to transfer information over the direct path between the virtual machine operating system and the network interface controller, and wherein (C) is performed by a component of the virtual machine operating system which communicates directly with both the bus and the virtual function miniport.

18. The at least one storage device of claim 16, wherein a first binding enables direct communication between the component of the virtual machine operating system and the bus, and a second binding enables direct communication between the component of the virtual machine operating system and the virtual function miniport.

19. The at least one storage device of claim 16, wherein (A) comprises receiving the information from a networking stack implemented by the virtual machine operating system, the networking stack causing the information to be formatted in accordance with at least one networking protocol.

* * * * *